United States Patent
Noble

(10) Patent No.: US 11,067,339 B2
(45) Date of Patent: Jul. 20, 2021

(54) CONDENSING A VOLATILIZED SUBSTANCE WITH A LIQUID

(71) Applicant: Senti Solutions Inc., Guelph (CA)

(72) Inventor: Linden Noble, Guelph (CA)

(*) Notice: Subject to any disclaimer, the term of this patent is extended or adjusted under 35 U.S.C. 154(b) by 0 days.

(21) Appl. No.: 16/269,742

(22) Filed: Feb. 7, 2019

(65) Prior Publication Data
US 2019/0383558 A1 Dec. 19, 2019

Related U.S. Application Data

(60) Provisional application No. 62/685,381, filed on Jun. 15, 2018.

(51) Int. Cl.
*F28B 3/00* (2006.01)
*F28B 3/06* (2006.01)
*F28B 9/02* (2006.01)

(52) U.S. Cl.
CPC . *F28B 3/06* (2013.01); *F28B 9/02* (2013.01)

(58) Field of Classification Search
CPC .................................. F28B 3/06; F28B 9/02
USPC ......................................................... 165/111
See application file for complete search history.

(56) References Cited

U.S. PATENT DOCUMENTS

| 2,122,210 A * | 6/1938 | Miller ...................... F25B 1/06 62/191 |
| 3,498,072 A * | 3/1970 | Stiefel ................... F24F 5/0003 62/118 |
| 4,322,251 A * | 3/1982 | Elliott ..................... C23C 22/02 134/107 |
| 5,618,490 A * | 4/1997 | Schulz ...................... C21C 7/10 266/208 |
| 9,655,937 B2 | 5/2017 | Jones |
| 2008/0289354 A1* | 11/2008 | Dudley ..................... F25B 5/02 62/335 |

* cited by examiner

Primary Examiner — Davis D Hwu
(74) Attorney, Agent, or Firm — Damien G. Loveland

(57) ABSTRACT

A volatilized substance is condensed using a vapor-liquid interface. The volatilized substance is diffused into a condenser vessel containing a cooling liquid via a diffusion device. When the volatilized substance comes into contact with the cooling liquid it is condensed. The large vapor-liquid surface area created by the diffusion device enhances the rate of condensation. The cooling liquid is circulated through a heat exchanger to remove heat introduced by the condensing vapor. The temperatures of the cooling liquid leaving and entering the condenser vessel are monitored.

20 Claims, 5 Drawing Sheets

CONDENSING A VOLATILIZED SUBSTANCE WITH A LIQUID

TECHNICAL FIELD

This application relates to a system and method for condensing a vapor. More specifically, it relates to a system that uses a vapor-liquid interface in order to condense a volatilized substance.

BACKGROUND

Condensers are used in many industries. For example, they are often used in refrigeration, distillation and various solvent recovery systems. The principle in all condensers is the same; a volatilized substance is cooled to below its boiling point to cause it to convert from vapor to liquid form.

The layout of condensers varies. In one of its simplest forms, a condenser has a jacketed vessel, where the jacket has a chilled substance circulated through it. This cools the inner surface of the vessel allowing contained vapor to condense on it. The major drawback of this is that the available chilled surface area limits the rate at which vapors can be condensed. This has been addressed in multiple ways, where coils and other configurations have been used to increase the available chilled surface area.

The issue with chillers is that the process of chilling the surface is often cost and energy intensive. Surfaces are commonly chilled using a refrigerant compressor system or a similar system, or through use of consumable materials like liquid nitrogen or liquid $CO_2$. These chillers are expensive, inefficient and do not scale well. Also, for example, a typical chiller or condensing system requires 30 l/min of water, which is roughly the same as what one would use with a faucet fully open.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a condensing system which incorporates a circuit of devices for condensing volatilized substances. These substances are condensed by passing bubbles of the vapor through a cooled reservoir of liquid substance. The vapor condenses rapidly as soon as it comes into contact with the cooled liquid, due to the large cooled surface area available for condensation. As a result, the liquid reservoir does not need to be cooled to as low a temperature as a solid surface of the same size would need to be in order to achieve the same rate of condensation. In some cases the temperature to which the liquid is cooled is above room temperature. This reduces or even eliminates the need for expensive chilling equipment.

The invention therefore provides advantages in the efficiency of condensing volatilized substances. The condensing system disclosed herein removes the need for power-hungry chillers, which are usually needed for condensing vapors on solid surfaces. Forcing the diffusion of the vapor through a liquid increases the effectiveness of the condensation process compared to circulating the vapor across a chilled surface, which only ever contacts part of the vapor.

With regards to performance, the condensation rate can be roughly the same as in other systems. However, the scalability of the present invention shows an improvement. Compared to other standard condensing systems, increasing the condensation rate necessitates the implementation of additional or larger chillers, which incur high energy costs, and many facilities may not have the water capacity to run them. Conversely, the present condensing system can be scaled by utilizing a larger heat exchanger or radiator, and potentially a stronger circulation pump.

Each embodiment of the present invention provides one or more of the advantages mentioned above.

Disclosed herein is a system for condensing a volatilized substance, comprising: a condenser vessel; a diffusion device inside said condenser vessel; a first inlet to introduce the volatilized substance into the diffusion device; a second inlet to introduce a cooling liquid into the condenser vessel; a circulation pump connected in fluid communication with the condenser vessel; a heat exchanger connected in fluid communication with the circulation pump and the condenser vessel; and an outlet for drawing off fluid from the condenser vessel; wherein the circulation pump pumps the cooling liquid from the condenser vessel through the heat exchanger and back to the condenser vessel.

In some embodiments the system comprises an overflow tube inside the condenser vessel and has an opening in an upper region of the condenser vessel, the overflow tube being in fluid communication with the outlet. The overflow tube in combination with the outlet drains off cooling liquid from the condenser vessel.

Also disclosed herein is a method for condensing a volatilized substance, comprising providing a system with a condenser vessel; a diffusion device inside said condenser vessel; a first inlet to introduce the volatilized substance into the diffusion device; a second inlet to introduce a cooling liquid into the condenser vessel; a circulation pump connected in fluid communication with the condenser vessel; a heat exchanger connected in fluid communication with the circulation pump and the condenser vessel; and an outlet for drawing off fluid from the condenser vessel; wherein the circulation pump pumps the cooling liquid from the condenser vessel through the heat exchanger and back to the condenser vessel. The method comprises filling, via the second inlet, the condenser vessel with the cooling liquid to at least submerge the diffusion device; pumping, with the circulation pump, the cooling liquid from the condenser vessel through the heat exchanger and back to the condenser vessel; feeding the volatilized substance into the diffusion device via the first inlet; and draining condensed volatilized substance from the condenser vessel via the outlet. In some embodiments, the feeding and draining steps occur concurrently. In other embodiments, the draining step occurs after the feeding step.

BRIEF DESCRIPTION OF DRAWINGS

The following drawings illustrate embodiments of the invention and should not be construed as restricting the scope of the invention in any way.

DESCRIPTION

A. Glossary

Condensed volatilized substance—refers to a substance in the liquid state, having been returned to the liquid state from the vapor state.

Condenser—refers to a device used for condensing a substance from its gaseous state to its liquid state.

Heat exchanger—or radiator—refers to a device that effectuates heat transfer between two fluids.

Sparger—refers to a device through which a substance in the gaseous state is diffused (i.e. a diffusion device). When immersed in a liquid, the porosity of the sparger facilitates the interface between the gas and the liquid.

Volatilized substance—refers to a substance in the gaseous state.

B. Overview

Figure 1:
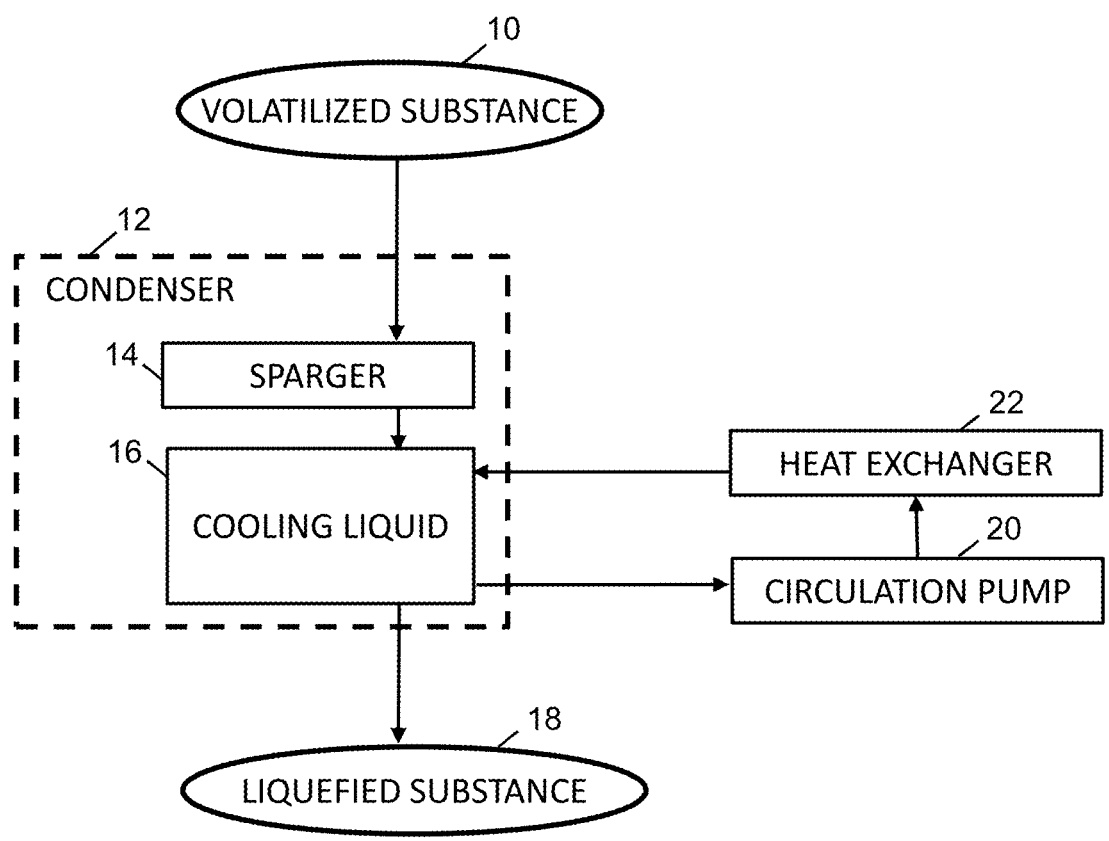
FIG. 1 is a block diagram representing the condensing system according to an embodiment of the present invention.

Referring to FIG. 1, there is shown the various components of the condensing system and their interrelation with each other. A volatilized substance 10 is introduced into the condenser 12 via a sparger 14. The volatilized substance 10 comes into contact with a cooling liquid 16 in the condenser 12, where it is condensed into a liquefied substance 18. A circulation pump 20 draws the cooling liquid 16 from the condenser 12 and pumps it to the heat exchanger 22. There, the heat exchanger 22 cools down the cooling liquid, which is then transferred back to the condenser 12. Thus, the temperature inside the condenser vessel 12 is regulated using the heat exchanger 22.

C. Apparatus

Figure 2:
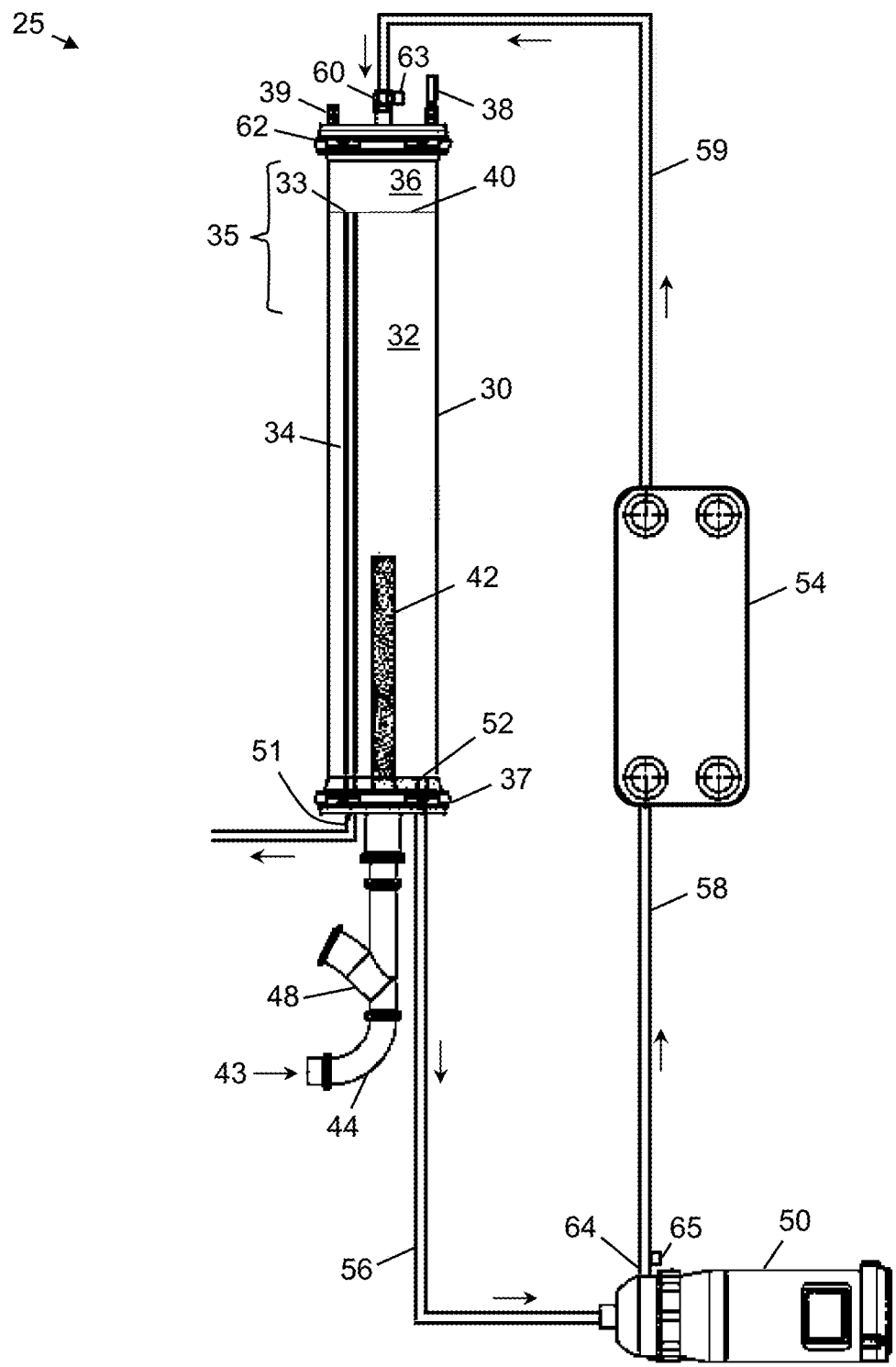
FIG. 2 is a drawing representing the condensing system according to an embodiment of the present invention.

Referring to FIG. 2, there is shown an exemplary representation of the condensing system 25. The condenser vessel 30 contains a cooling liquid 32 filling said vessel until it reaches the opening 33 of an overflow tube 34 located inside the condenser vessel at an upper region 35 thereof. The upper region is considered to be the upper quarter of the condenser vessel 30. Above the cooling liquid 32 at the top of the vessel is a space 36 filled with air, inert gas and/or vapor of the liquid. The initial starting volume of cooling liquid 32 is provided through an inlet port 52 at the bottom 37 of the condenser vessel 30. Safety devices are mounted on ports on the top of the condenser vessel 30, such as a pressure relief valve 38 and a pressure transducer 39 for digitally monitoring system parameters. The maximum level 40 of the cooling liquid 32 contained in the condenser vessel 30 depends on the height of the overflow tube 34.

The cooling liquid 32 is a mixture of an initial cooling liquid that was initially introduced into the condenser vessel 30 and the liquefied substance, which, depending on the embodiment is the same or different to the cooling liquid.

The condenser vessel 30 may be made of stainless steel, glass or any material that can handle the conditions implied by the contact between the cooling liquid and liquefied substance and the inner surface of the condenser vessel 30. This also applies to the pressure resulting from the introduction of a vapor into the condenser vessel 30. The size of the condenser vessel 30 should be tall and wide enough to hold a sufficient volume of liquid to provide adequate condensation of the volatilized substance.

The overflow tube 34 is inside the condenser vessel 30 in order to initially remove any excess of the initial fill of cooling liquid 32, although the initial fill does not need to be as high as the top of the overflow tube. Before running the condensing operation, the sparger 42 should be completely submerged in the cooling liquid 32. During operation of the condensing system 25, the overflow tube 34 is used continuously to drain the liquefied substance from the condenser vessel 30 (which may be the same as or different to the cooling liquid 32) via outlet port 51. The size and proportion of the overflow tube 34 may differ in relation to the condenser vessel's size and the type of liquid substance(s) inside.

A sparger tube or sparger 42 is present inside the condenser vessel 30. This sparger tube 42 is used to introduce the volatilized substance 43 into the condenser vessel 30. The lower part or inlet pipe 44 of the sparger 42 extends outside the condenser vessel 30. The sparger 42 is mounted on the bottom surface 37 of the condenser vessel 30. The inlet pipe 44 of the sparger 42 has a check valve 48 that is used to prevent the condenser vessel 30 from draining when the volatilized substance 43 is not being fed into the condensing system 25. The vapor diffusion through the sparger 42 increases the efficiency of the condensation process by maximizing the contact surface area between the vapor and the cooling liquid 32. The sparger 42 may be replaced with a mesh or other dispersion apparatus (i.e. dispersion device) in other embodiments.

As the volatilized substance 43 condenses in the cooling liquid 32, the cooling liquid warms up. A circulation pump 50 is used to carry out the warmed cooling liquid 32 from the condenser vessel 30 through port 52 to a heat exchanger 54, via respectively two pipes 56 and 58. The connecting pipes 56 and 58 may be made of flexible or rigid material.

Here, a plate-type exchanger 54 is used but various types of heat exchanger such as a shell and tube exchanger may be used instead. The cooling process in the heat exchanger 54 is via circulating water and a radiator, tap water flowing through and a heat exchanger, convection in air, forced convection, or is achieved with a chiller. The considerations regarding the compatibility of the cooling liquid 32 and the flow rate necessary for cooling the condenser vessel 30 will prescribe the choice for the type of heat exchanger. Moreover, the choice of heat exchanger 54 depends on the thermal characteristics of the volatilized substance to be condensed and the rate at which it is to be condensed. The heat exchanger 54 is connected via a pipe 59 to an inlet 60 at the top 62 of the condenser vessel 30. Cooled cooling liquid 32, cooled by the heat exchanger 54, enters the condenser vessel 30 via the inlet 60 to cool down the cooling liquid 32 still in the condenser vessel and to condense further volatilized substance 43 continuously entering the condenser vessel via inlet 44. The flow of the cooled cooling liquid 32 in the condenser vessel 30 is downwards, in counterflow with the gaseous bubbles of volatilized substance 43 rising out of the sparger 42.

The cooling liquid 32 inside the condenser vessel 30 can be at room temperature, above room temperature or below room temperature. In some embodiments, tap water may be used as the cooling liquid 32 in the condensing system 25.

A thermometer 63 is mounted on or at the inlet 60 located at the top 62 of the condenser vessel 30 in order to monitor the temperature of the cooled cooling liquid 32 entering the condenser vessel 30. A second thermometer 65 is located on or at the outlet 64 of the circulation pump 50, where the cooling liquid 32 passes through. The second thermometer 65 is installed at this location to obtain the temperature of the cooling liquid 32 drawn out of the condenser vessel 32 by the circulation pump 50. Both thermometers 63, 65 provide an insight on the cooling effectiveness of the heat exchanger 54 cooling loop.

An energy consumption comparison between the present condensing system 25 that uses a simple circulation pump (208V, 256 W and 1.28 A) and a large standard condensing device used in other systems (for example 460V, 27600 W with a 60 A draw) that provide a comparable condensation rate to that of the present invention shows the relatively low energy cost of the presently disclosed condensing system.

If circulating water is used in other chilling systems, then a favorable comparison can be made regarding water requirements. Compared to other condensing systems where water is passed through a heat exchanger or radiator in order to provide cooling for a compressor, the present condensing system 25 is doubly efficient as it reduces both the energy costs and has no water requirements. If we were to compare the condensing system 25 to other systems that only use tap water for chilling, i.e. without a compressor, then an advantage would be that it does not use water as a consumable.

In one particular example, the condenser vessel 30 has an internal diameter of 6" (16 cm) and is 42" (107 cm) tall. The sparger 42 is made of a 10" (26 cm) long cylindrical piece of sintered stainless steel with a 2" (6 cm) diameter and a porosity of 50 µm. However, various other sparger sizes and shapes may be used in other embodiments as long as they have a porous surface. Different types of material can be used for the sparger 42 as long as they are non-reactive with the volatilized substance. In addition, various pore sizes, shapes and/or geometries can be used. The condensing system 25 can condense a volatilized substance to a liquefied substance at a flow rate of about 100 l/h, for example. However, the measurement of the introduced gas volume is difficult since it depends on the back pressure.

The condensing system is used, for example, to condense ethanol vapor, using ethanol as the cooling liquid. Using a cooling liquid that is the same substance as the volatilized substance renders the collection of the liquefied substance simple, as there is no need to separate the two. Liquid ethanol is used for ethanol vapor condensation since it has a better cooling capacity than other immiscible cooling liquids that would be needed for ethanol.

This condensing system also works with hexane as is, although less effectively than ethanol due to hexane being more difficult to circulate as it is much less viscous. In addition, hexane has lower heat conductivity than ethanol. Condensing a compound like hexane may be better with changes in parameters of the condensing system such as the size of the condenser vessel 30, cooling liquid 32 used and/or the specifications of the heat exchanger 54.

The volatility of the substance and the rate of operation will dictate which type of heat exchanger, cooling liquid, and circulation pump, as well as size of condenser vessel will be necessary. However, considerations into condensing system design also relate to the type of substance being condensed. More volatile substances will generally require lower temperatures, which means that a chiller will need to be employed or a more robust heat exchanger. Similarly, a higher rate of condensation will necessitate an increase of the size of the condenser vessel 30 or a more robust heat exchanger 54. As an example, if ethanol is being evaporated at a rate of 100 l/h then it can be effectively condensed in a condenser vessel 30 with the aforementioned dimensions, chilled by the circulating cooling liquid 32.

Figure 3:
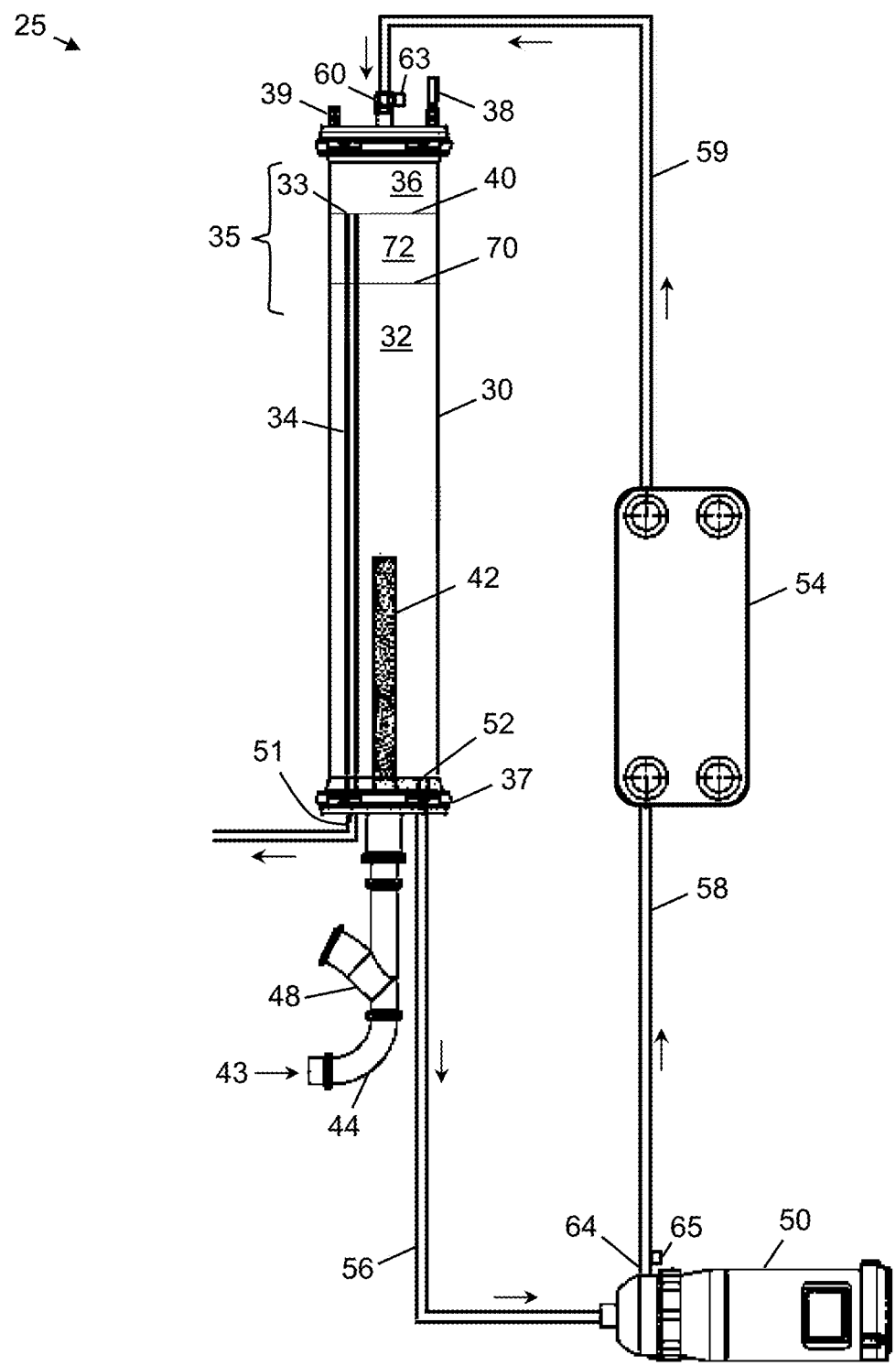
FIG. 3 is a drawing representing the condensing system in a different mode of operation, according to an embodiment of the present invention.

Referring to FIG. 3, another mode of operation of the condenser system 25 is shown, in which the volatilized substance 43 and cooling liquid 32 are different substances. Before running a condensing process in this mode, the condenser vessel 30 is filled to an intermediate level 70 with the cooling liquid 32, which for example is water. Before running the condensing operation, the sparger 42 is completely submerged in the cooling liquid 32. The cooling liquid 32 is chosen regarding its ability and suitability to cool down the volatilized substance 43, which in this mode of operation is hexane, for example. Water has a high heat capacity and is used in order to condense the vapor of hexane since hexane is not miscible in water.

During operation, the condensed hexane 72, which has a significantly lower density than water, rises above the water (i.e. cooling liquid 32) in the condenser vessel 30. The hexane 72 collects as a liquid above the water 32 until its level reaches the level of the opening 33 of the overflow tube 34, at which point the hexane 72 is continuously drawn off from the upper part of the condenser vessel 30, via outlet 51.

Figure 4:
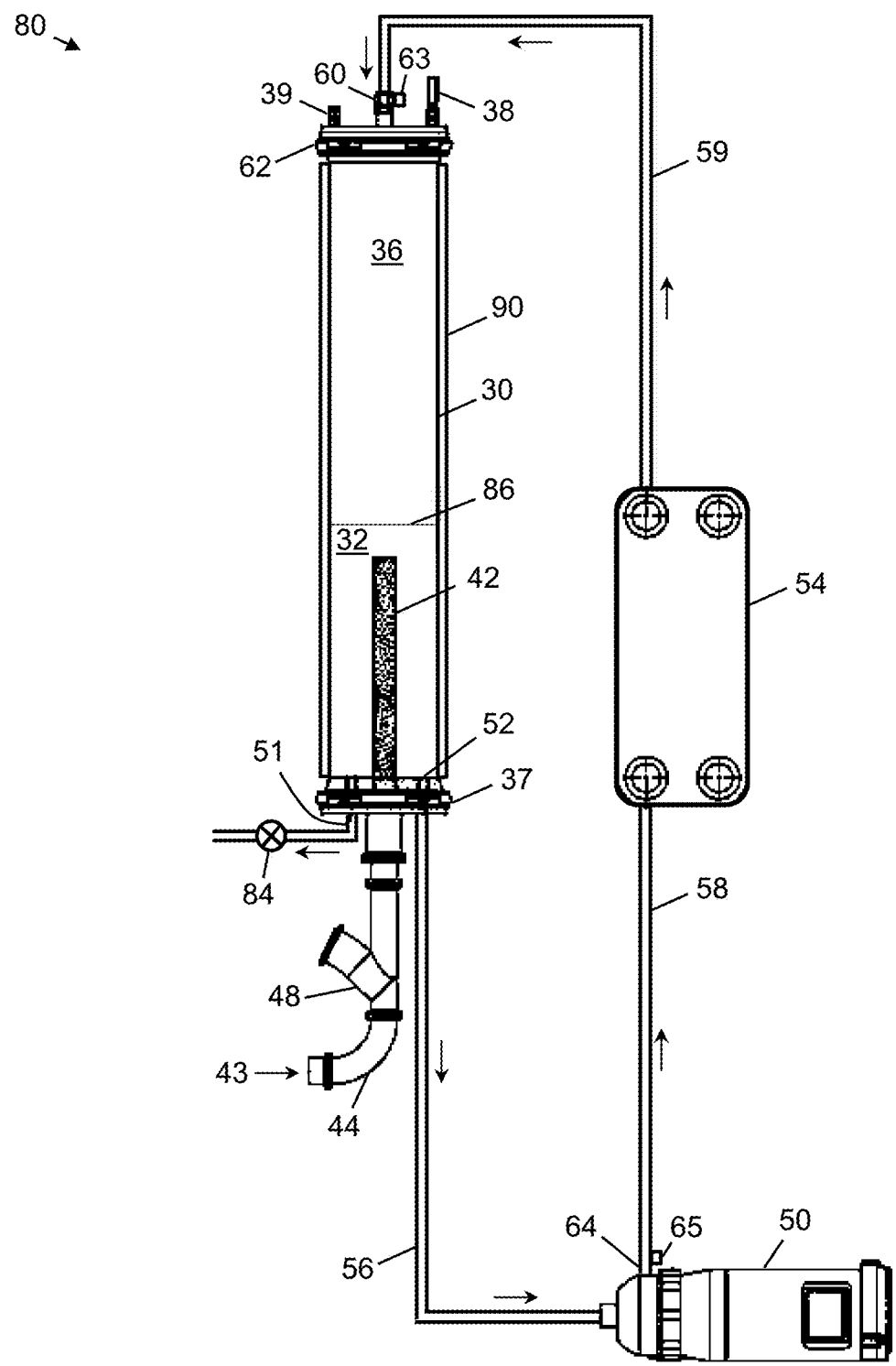
FIG. 4 is a drawing representing the condensing system according to another embodiment of the present invention.

Referring to FIG. 4, another embodiment of the condenser system 80 is shown. In this embodiment, the overflow tube is absent, however, the drainage port 82 through which it drained is still present, leading to the outlet 51. A valve 84 is present downstream of the drainage port 82. In this embodiment, a batch mode method is employed to condense the volatilized substance 43 entering via inlet 44. Before running the batch, the condenser vessel 30 is filled with the cooling liquid 32 to an intermediate level 86, which is sufficient for the sparger 42 to be completely submerged in the cooling liquid. During operation, the level of the cooling liquid 32 rises as the volatilized substance 43 condenses in it. At the end of the batch, the valve 84 is opened and the cooling liquid 32 and condensed volatilized substance are drained as one liquid out of the condenser vessel 30 via the drainage port 82.

D. Exemplary Process

Figure 5:
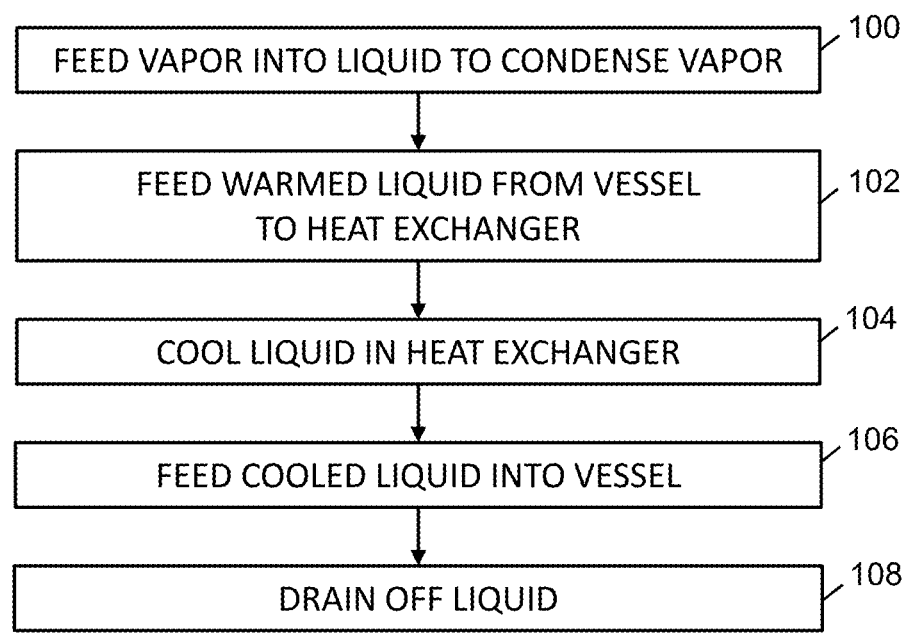
FIG. 5 is a flowchart describing the key steps for condensing a volatilized substance through the condensing system according to an embodiment of the present invention.

Referring to FIG. 5, a flow chart describes the functioning steps of the condensing system 25. In step 100, the vapor of a volatilized substance 43 is introduced into the condenser vessel 30 via the sparger 42 in order to be condensed into a liquid by the cooling liquid 32 inside the condensing vessel. In step 102, the cooling liquid 32, now warmed, is fed into the heat exchanger 54 from the condenser vessel 30. Then, the cooling liquid 32 is cooled by the heat exchanger 54 in step 104. After that, the cooled liquid 32 is fed back into the condenser vessel 30 in step 106. Finally, in step 108, the condensed vapor is drained off from the condenser vessel 32. The whole process repeats continuously during the continuous mode condensing operation. In batch mode, steps 100-106 repeat during the condensation and step 108 takes place after step 100 has been completed.

In one embodiment both the cooling liquid 32 and the volatilized substance are ethanol, since there is no other obvious cooling liquid that would be immiscible with ethanol with a better cooling capacity. In another embodiment both the cooling liquid 32 and the volatilized substance are hexane. In yet another embodiment, the cooling liquid 32 is water and the volatilized substance is hexane, since hexane is immiscible with water.

E. Variations

Optionally, a cooling jacket (90, FIG. 4) is mounted on the condenser vessel 32 to improve the condensing efficiency and/or condensing rate of the volatilized substance inside the condenser.

The efficiency and/or condensing rate of the condensing system 25 can be increased through the addition of further heat exchangers.

Additional structures may be incorporated inside the condenser vessel to prevent cooled liquid that enters at the top of the vessel from splashing into the opening of the overflow pipe.

In some embodiments, the heat that the heat exchanger dissipates is used to partially warm up the liquid that is being volatilized.

Dimensions that have been given to the nearest 1 cm include all dimensions within a range of ±0.5 cm of the given value. Numerical parameters in general are understood to be approximate to within about 10%.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. For example, various sensors, valves, jackets and pipes are not shown for clarity. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. All parameters, dimensions, materials, geometries and configurations described herein are examples only and may be changed depending on the specific embodiment. Accordingly, the scope of the invention is to be construed in accordance with the substance defined by the following claims.

The invention claimed is:

1. A system for condensing a volatilized substance, comprising:
   a condenser vessel;
   a sparger inside said condenser vessel;
   a first inlet to introduce the volatilized substance into the sparger;
   a second inlet to introduce a cooling liquid into the condenser vessel;
   a circulation pump connected in fluid communication with the condenser vessel;
   a heat exchanger connected in fluid communication with the circulation pump and the condenser vessel; and
   an outlet for drawing off fluid from the condenser vessel;
   wherein the circulation pump pumps the cooling liquid from the condenser vessel through the heat exchanger and back to the condenser vessel.

2. The system of claim 1, wherein the cooling liquid immerses the sparger and the heat exchanger cools the cooling liquid.

3. The system of claim 1, comprising an overflow tube inside the condenser vessel and having an opening in an upper region of the condenser vessel, the overflow tube being in fluid communication with the outlet.

4. The system of claim 3, wherein the overflow tube in combination with the outlet drains off cooling liquid from the condenser vessel.

5. The system of claim 1, comprising:
   a pipe in fluid communication with the first inlet; and
   a check valve in the pipe for preventing cooling liquid in the condenser vessel from draining through the sparger and the pipe.

6. The system of claim 1, comprising a pressure relief valve mounted on a top of the condenser vessel.

7. The system of claim 1, comprising a pressure transducer mounted on a top of the condenser vessel.

8. The system of claim 1, wherein the heat exchanger is a plate type heat exchanger.

9. The system of claim 1, wherein the sparger is made of a material that is non-reactive with the volatilized substance.

10. The system of claim 1, comprising water as the cooling liquid.

11. A system for condensing a volatilized substance, comprising:
    a condenser vessel;
    a dispersion device inside said condenser vessel;
    a first inlet to introduce the volatilized substance into the dispersion device;
    a second inlet to introduce a cooling liquid into the condenser vessel;
    a circulation pump connected in fluid communication with the condenser vessel;
    a heat exchanger connected in fluid communication with the circulation pump and the condenser vessel;
    an outlet for drawing off fluid from the condenser vessel;
    a first thermometer located to monitor a temperature of the cooling liquid entering the condenser vessel; and
    a second thermometer located to monitor a temperature of the cooling liquid drawn out of the condenser vessel by the circulation pump;
    wherein the circulation pump pumps the cooling liquid from the condenser vessel through the heat exchanger and back to the condenser vessel.

12. The system of claim 1, wherein:
    the condenser vessel has an internal diameter of 6" (16 cm) and internal height of 42" (107 cm);
    the sparger is made of a 10" (26 cm) long cylindrical piece of sintered stainless steel with a 2" (6 cm) diameter and a porosity of 50 µm;
    the circulation pump has a power of 0.25 kW; and
    the system can condense the volatilized substance to a liquefied substance at a flow rate of 100 l/h.

13. The system of claim 1 comprising a cooling jacket around the condenser vessel.

14. The system of claim 11, wherein the cooling liquid immerses the dispersion device and the heat exchanger cools the cooling liquid.

15. The system of claim 11, comprising an overflow tube inside the condenser vessel and having an opening in an upper region of the condenser vessel, the overflow tube being in fluid communication with the outlet.

16. The system of claim 15, wherein the overflow tube in combination with the outlet drains off cooling liquid from the condenser vessel.

17. The system of claim 11, comprising:
    a pipe in fluid communication with the first inlet; and
    a check valve in the pipe for preventing cooling liquid in the condenser vessel from draining through the dispersion device and the pipe.

18. The system of claim 11, comprising a pressure relief valve mounted on a top of the condenser vessel.

19. The system of claim 11, comprising a pressure transducer mounted on a top of the condenser vessel.

20. The system of claim 11, wherein the heat exchanger is a plate type heat exchanger.

* * * * *